United States Patent [19]

von der Crone

[11] 4,259,488
[45] Mar. 31, 1981

[54] BIS-ISOINDOLINE PIGMENTS

[75] Inventor: Jost von der Crone, Riehen, Switzerland

[73] Assignee: Ciba-Geigy Corporation, Ardsley, N.Y.

[21] Appl. No.: 46,289

[22] Filed: Jun. 7, 1979

[30] Foreign Application Priority Data

Jun. 19, 1978 [CH] Switzerland .......................... 6645/78

[51] Int. Cl.$^3$ ............................................. C09B 57/04
[52] U.S. Cl. ................................. 544/296; 106/288 Q; 260/37 P; 260/42.21
[58] Field of Search .......................................... 544/296

[56] References Cited

U.S. PATENT DOCUMENTS 3,646,033  2/1972  Leister et al. .......................... 544/353
3,923,806  12/1975  Bock et al. ............................ 544/300

FOREIGN PATENT DOCUMENTS 1534666  12/1978  United Kingdom .

*Primary Examiner*—Paul M. Coughlan, Jr.
*Attorney, Agent, or Firm*—Harry Falber

[57] ABSTRACT

Isoindoline pigments of the formula

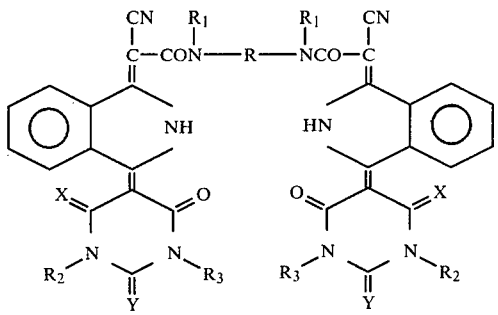

or of a formula which is a tautomer thereof, wherein R represents a direct bond or an aliphatic, cycloaliphatic, aliphatic-cycloaliphatic, araliphatic or aromatic radical, $R_1$ represents a hydrogen atom or an alkyl group of 1 to 4 carbon atoms, or, if R represents an ethylene group, both $R_1$s together also represent an ethylene group, $R_2$ and $R_3$ represent hydrogen atoms, alkyl groups of 1 to 4 carbon atoms or phenyl groups which are unsubstituted or substituted by methyl groups or halogen atoms, X represents an oxygen atom or a NH group, and Y represents an oxygen or a sulfur atom or a NH group dye plastics in fast yellow or brown shades.

4 Claims, No Drawings

BIS-ISOINDOLINE PIGMENTS

The invention relates to novel isoindoline pigments of the formula

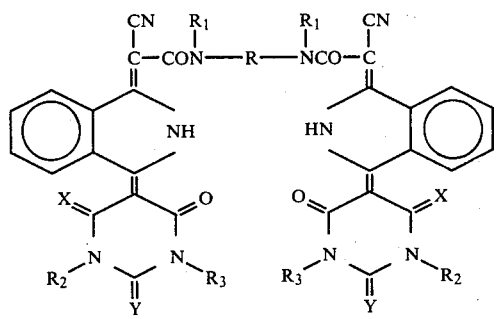

(1)

or of a formula which is a tautomer thereof, wherein R represents a direct bond or an aliphatic, cycloaliphatic, aliphatic-cycloaliphatic, araliphatic or aromatic radical, $R_1$ represents a hydrogen atom or an alkyl group of 1 to 4 carbon atoms, or, if R represents an ethylene group, both $R_1$s together also represent an ethylene group, $R_2$ and $R_3$ represent hydrogen atoms, alkyl groups of 1 to 4 carbon atoms or phenyl groups which are unsubstituted or substituted by methyl groups or halogen atoms, X represents an oxygen atom or an NH group, and Y represents an oxygen or a sulfur atom or a NH group.

An aliphatic radical R is preferably an alkylene radical of 2 to 6 carbon atoms. The alkylene radical can also be interrupted by heteroatoms, for example oxygen or sulfur atoms, or by imino groups. R as a cycloaliphatic radical is in particular a cyclohexyl radical. R as an aliphatic-cycloaliphatic radical is preferably an alkylene-cycloalkylene radical of 7 to 20 carbon atoms, for example a cyclopentane or cyclohexane ring which is attached to both carboxy amide groups through one or two alkylene groups, preferably methylene groups, or wherein two or more cyclohexane radicals are attached to each other through alkylene groups. An araliphatic radical represented by R is preferably alkylene phenylene of 7 to 20 carbon atoms, such as a bis-methylenephenylene radical. Finally, an aromatic radical R is, for example, a naphthylene, diphenylene, diphenylmethane, diphenylsulfone or, preferably, phenylene radical, and, in particular, a p-phenylene radical which can be substituted by chlorine atoms, methyl, methoxy or ethoxy groups.

Particularly interesting isoindolines are those of the formula

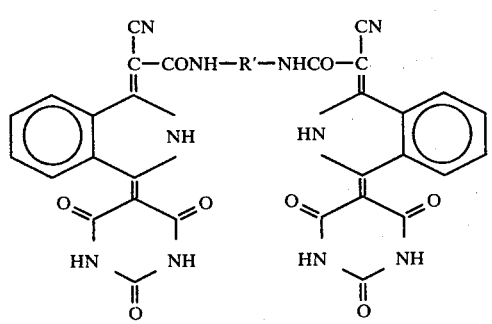

(2)

wherein R' represents an alkylene radical of 2 to 6 carbon atoms and those of the formula (1), wherein R represents an ethylene group and both $R_1$s together also represent an ethylene group.

The isoindolines of the present invention are obtained by condensing an isoindoline of the formula

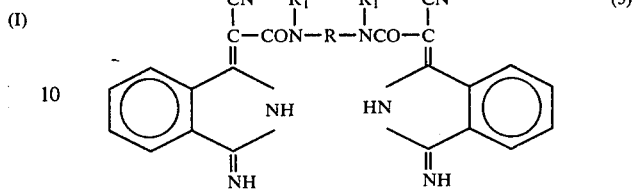

(3)

or of a formula which is a tautomer thereof, in the molar ratio 1:2 with a pyrimidone of the formula

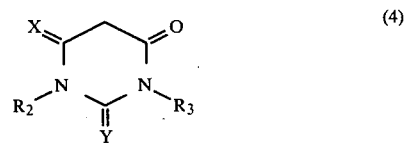

(4)

The isoindoline of the formula (3) used as starting material is obtained by condensation of 2 moles of 1-amino-3-imino-isoindolenine or 1-amino-3,3'-dialkoxy-isoindolenine with 1 mole of the bis-cyanoacetyldiamine of the formula

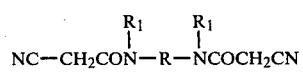

in a manner known per se, advantageously in water or an organic solvent, for example an alcohol, such as methanol, ethanol, isopropanol or ethylene glycol monoethyl ether, glacial acetic acid, o-dichlorobenzene, dimethyl acetamide, dimethyl sufoxide, N-methylpyrrolidone, dioxane, nitrobenzene or dimethyl formamide, at elevated temperature.

The bis-cyanoacetyldiamine is obtained by condensation of 2 moles of an alkylcyanoacetate with a corresponding diamine.

Examples of diamines are:
hydrazine
N,N'-dimethylhydrazine
ethylendiamine
N,N-dimethylethylenediamine
N,N-diethylethylenediamine
1,3-propylenediamine
N,N-dimethyl-1,3-propylenediamine
N,N-diethyl-1,3-propylenediamine
1,2-propylenediamine
2,2-dimethyl-1,3-propylenediamine
1,4-butylenediamine
1,6-hexylenediamine
2,2'-diaminodiethylether
1,3-cyclohexylenediamine
1,4-cyclohexylenediamine
1-amino-3,6,6-6-trimethyl-3-aminomethylcyclohexane
bis-(4-amino-3-methylcyclohexyl)-methane
1,3-or 1,4-bis-aminomethylcyclohexane
4-aminobenzylamine
1,3-bis-aminomethylbenzene
1,4-bis-aminomethylbenzene
1,4-bis-aminomethyltetrachlorabenzene 1,3-phenylenediamine
1,4-phenylenediamine
2-chloro-1,4-phenylenediamine
2-methyl-1,4-phenylenediamine
2-methyl-1,3-phenylenediamine
2,5-dichloro-1,4-phenylenediamine
2,5-dimethyl-1,4-phenylenediamine
2-chloro-5-methyl-1,4-phenylenediamine
2-chloro-5-methoxy-1,4-phenylenediamine
2-methyl-5-methoxy-1,4-phenylenediamine
3,3'-dimethyl-4,4'-diaminodiphenyl
3,3'-dichloro-4,4'-diaminodiphenyl
4,4'-diamino-diphenylmethane
3,3'-dimethyl-4,4'-diaminodiphenylmethane
4,4'-diamino-diphenylsulfone
piperazine The isoindolines of the formula (3) are reacted with the pyrimidones of the formula (4).

Suitable pyrimidones are in particular barbituric acid and the N-substituted barbituric acids, such as N,N-dimethylbarbituric acid, N,N-diethylbarbituric acid, N-N-dibutylbarbituric acid, N-methyl-N-phenylbarbituric acid, N-methyl-N-m- or -p-chlorophenylbarbituric acid, N,N-diphenylbarbituric acid, 2-thiobarbituric acid, 2-iminobarbituric acid, 2,4-diiminobarbituric acid, 2-thio-4-iminobarbituric acid.

The reaction of the imino-isoindolines with the pyrimidones is advantageously carried out in water or an organic solvent at elevated temperature, preferably at 80°–180° C., and, if necessary, under pressure. Examples of suitable organic solvents are: aliphatic alcohols, such as methanol, ethanol, isopropanol, isobutanol, amyl alcohol or ethylene glycol monoethyl ether, o-dichlorobenzene, dimethyl formamide, dimethyl acetamide, dimethyl sulfoxide, N-methylpyrrolidone, dioxane, nitrobenzene or sulfolane.

To effect as complete a condensation as possible, the reaction is advantageously carried out in the presence of an acid, for example an aliphatic carboxylic acid, such as formic acid, acetic acid, oxalic acid, succinic acid or chloroacetic acid, an aromatic carboxylic acid, such as benzoic acid, salicylic acid or phthalic acid, an aromatic sulfonic acid, such as benzenesulfonic acid or naphthalenesulfonic acid. The reaction is preferably carried out in acetic acid or in a mixture of water and formic or acetic acid.

Since the resultant condensation products are sparingly soluble in the above solvents, they can be easily isolated by filtration. Any impurities can be removed by washing off.

The pigments of this invention have in general a good texture and can be widely used as crude products. If necessary or desired, the crude products can be converted into a finely dispersed form by grinding or kneading, advantageously using grinding assistants, such as inorganic and/or organic salts in the presence or absence of organic solvents. After the grinding procedure, the assistants are removed in the conventional manner: soluble inorganic salts for example with water, and water-insoluble assistants for example by steam distillation. The properties of the crude pigments can often be improved by treating them with organic solvents, preferably those having a boiling point above 100° C.

The pigments of the formula I have excellent suitability for colouring plastics materials, including both solvent-free and solvent-containing materials made of plastics or synthetic resins (in oil paints and water paints, in lacquers of different kinds, for the mass colouration of viscose or cellulose acetate, for pigmenting polyethylene, polystyrene, polyvinyl chloride, rubber and artificial leather). They can also be used in printing inks for the graphic trade, for paper pulp dyeing, for coating textiles, or for pigment printing.

The colourations obtained are distinguished by their excellent fastness to light, migration, efflorescence, overstripe bleeding, solvents and by excellent heat resistance, and also by good dispersibility, high tinctorial strength, brilliance and gloss.

The invention is illustrated by the following Examples.

EXAMPLE 1

3.87 g of 1-amino-3-imino-isoindolenine and 1.95 g of bis-cyanoacetylethylenediamine are heated in 50 ml of water for 2 hours to reflux temperature. Then 2.56 g of barbituric acid and 20 ml of acetic acid are added and the mixture is refluxed for a further 5 hours. The pigment is collected hot with suction and washed with water and dried, affording 5.1 g of a yellow colourant powder. When incorporated in lacquers without further treatment, this pigment produces brilliant, strong colourations of outstanding fastness to overstripe bleeding. For incorporation in printing inks or plastics, the pigment is advantageously brought into the form of a preparation. This is accomplished by known methods by coating the finely dispersed pigment with substrate-compatible resins. When the pigment is used in printing, brilliant yellow colourations of excellent lightfastness are obtained. The bis-cyanoacetylethylenediamine (m.p. 191° C.) is obtained by conventional methods by reaction of ethylenediamine with ethyl cyanoacetate.

EXAMPLE 2

15.5 g of 1-amino-3-imino-isoindolenine and 3.88 g of bis-cyanoacetylethylenediamine are heated for 3 hours to reflux temperature in 100 ml of methanol. The precipitate is collected with suction, washed with methanol and water and dried, affording 8.4 g of dicondensation compound. To react free imino groups still present, 4.5 g of this compound are heated with 2.56 g of barbituric acid in 100 ml of glacial acetic for 4 hours to 100° C. The pigment is collected hot with suction, washed with methanol and water and dried, affording 6.4 g of yellow pigment dye which is comparable with the product obtained in Example 1.

EXAMPLES 3 TO 17

Table I lists further pigments of the formula (2) which are obtained by condensing the bis-cyanoacetyl compound of the diamine of column 2 in accordance with the particulars of Example 2, in the molar ratio 1:2 first with 1-amino-3-imino-isoindolenine and then with barbituric acid.

The pigments obtained are all distinguished by a pure yellow shade and high tinctorial strength.

TABLE I

| Example | Diamine |
|---|---|
| 3 | 1,4-bis-aminomethyltetrachlorobenzene |
| 4 | 1,3-bis-aminomethylbenzene |
| 5 | 1,4-butylenediamine |
| 6 | 1,6-hexylenediamine |
| 7 | 1,3-propylenediamine |
| 8 | 1-methyl-1,2-ethylenediamine |
| 9 | 2,3-diphenyl-1,4-butylenediamine |
| 10 | 1,3-diphenyl-1,3-propylenediamine |

TABLE I-continued

| Example | Diamine |
|---|---|
| 11 | 1-amino-3,6,6-trimethyl-3-aminomethylcyclohexane |
| 12 | 3,3'-dimethyl-4,4'-diaminodicyclohexylmethane |
| 13 | 2,2-dimethyl-1,3-propylenediamine |
| 14 | piperazine |
| 15 | N,N-dimethylethylenediamine |
| 16 | N,N-diethylethylenediamine |
| 17 | N,N-diethyl-1,3-propylenediamine |

EXAMPLE 18

11.6 g of 1-amino-3-isoindolenine and 5.12 g of bis-cyanoacetyl-2-methyl-1,3-phenylenediamine are stirred in 100 ml of dimethyl formamide for 1 hour at room temperature and then heated for 1 hour to 120° C. The precipitate is collected by filtration at 100° C. and worked up as described in Example 2, affording 9.2 g of yellow discondensation product. 5.12 g of this compound and 2.56 g of barbituric acid are refluxed in 100 ml of acetic acid. The mixture is diluted with 50 ml of dimethyl formamide and heated for a further 4 hours to reflux temperature. The pigment dye is collected hot with suction, washed with dimethyl formamide and water and dried, affording 5.4 g of pigment. When incorporated in lacquers without further treatment, this pigment produces strong orange colourations of excellent fastness to overstripe bleeding and light.

EXAMPLES 19 TO 23

Table II lists further pigments of the formula (2) which are obtained by condensing, according to the particulars of Example 18, the biscyanoacetyl compound of the diamine of column 2 firstly with 1-amino-3-imino-isoindolenine, then with barbituric acid. Column 3 indicates the shade obtained in lacquers. The pigments are distinguished by high tinctorial strength and good fastness properties.

TABLE II

| Example | Diamine | Shade in lacquers |
|---|---|---|
| 19 | 1,4-phenylenediamine | brown |
| 20 | 1,3-phenylenediamine | yellowish brown |
| 21 | 2,5-dimethyl-1,4-phenylenediamine | brown |
| 22 | 4,4'-diaminodiphenylsulfone | yellow |
| 23 | 3,3'-dimethyl-4,4'-diamino-diphenyl | |

EXAMPLE 24

The procedure of Example 2 is repeated using 5.63 g of 1-methyl-3-m-chlorophenylbarbituric acid instead of barbituric acid. Yield: 7.9 g of a yellow colourant powder. When incorporated in lacquers without further treatment, this pigment produced brilliant strong colourations of excellent fastness to overstripe bleeding.

EXAMPLES 25 TO 27

Table III lists further pigments of the formula (1) which are obtained by condensing the bis-cyanoacetyl compound of the diamine of column 2, according to the particulars of Example 2, in the molar ratio 1:2 first with 1-amino-3-imino-isoindolenine and then with the barbituric acid of column 3. Column 4 indicates the shade obtained with the resulting pigment in lacquers.

TABLE III

| Example | Diamine | Barbituric acid | Shade |
|---|---|---|---|
| 25 | ethylenediamine | 1,3-dimethylbarbituric acid | yellow |
| 26 | ethylenediamine | 2-iminobarbituric acid | yellow |
| 27 | piperazine | 1-methyl-3-m-chlorophenyl barbituric acid | yellow |

EXAMPLE 28

2 g of the pigment obtained in Example 1 are gound with 36 g of toner dehydrate, 60 g of boiled linseed oil of medium viscosity and 2 g of cobalt linoleate on a three roll mill. The yellow prints obtained with the resultant colour paste are strong and fast to light.

EXAMPLE 29

0.6 g of the pigment obtained in Example 1 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The yellow colouration obtained is strong and fast to migration, heat and light.

EXAMPLE 30

10 g of titanium dioxide and 2 g of the pigment obtained in Example 14 are ground for 48 hours in a ball mill with 88 g of a mixture of 26.4 g of coconut alkyd resin, 24 g of melamine/formaldehyde resin (50% solids content), 8.8 g of ethylene glycol monomethyl ether and 28.8 g of xylene. The resultant lacquer is sprayed onto an aluminum sheet, predried for 30 minutes at room temperature and then stoved for 30 minutes at 120° C. A yellow finish of very good colour strength and distinguished by good fastness to overstripe bleeding and light is obtained.

What is claimed is:

1. An isoindoline pigment of the formula (I)

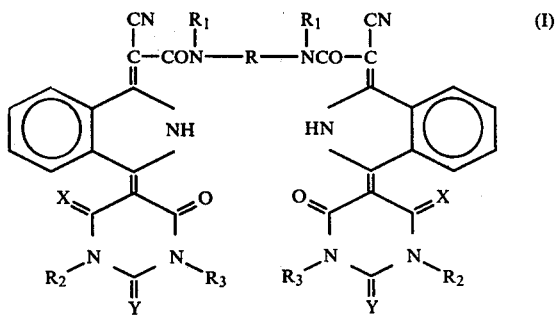

or of a formula (II)

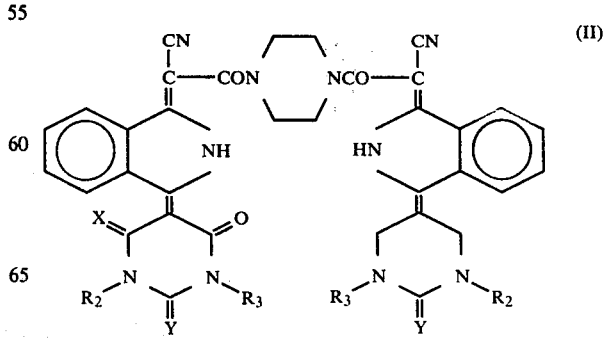

or a tautomer thereof, wherein R represents alkylene of 2 to 6 carbon atoms, unsubstituted phenylene, monomethylphenylene, dimethylphenylene, or alkylene phenylene of 7 to 20 carbon atoms; $R_1$ represents hydrogen or alkyl of 1 to 4 carbon atoms; $R_2$ and $R_3$ independently represent hydrogen, alkyl of 1 to 4 carbon atoms, phenyl or phenyl substituted with methyl or halogen; X represents oxygen or NH; and Y represent oxygen, sulfur or NH.

2. An isoindoline pigment of the formula (I) according to claim 1 wherein R represents alkylene of 2 to 6 carbon atoms; $R_1$, $R_2$, and $R_3$ represent hydrogen; and X and Y represent oxygen.

3. An isoindoline pigment of the formula I according to claim 2 wherein R represents ethylene.

4. An isoindoline pigment of the formula II according to claim 1 wherein $R_2$ and $R_3$ represent hydrogen; and X and Y represent oxygen.

UNITED STATES PATENT AND TRADEMARK OFFICE
CERTIFICATE OF CORRECTION

PATENT NO. : 4,259,488
DATED : March 31, 1981
INVENTOR(S) : Jost von der Crone

It is certified that error appears in the above—identified patent and that said Letters Patent is hereby corrected as shown below:

Claim 1, column 6, Fromula II, lower right of structure reads

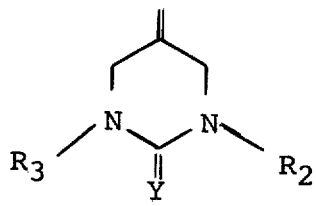　　　should read　　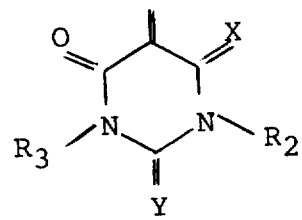

[SEAL]

Attest:

*Attesting Officer*

Signed and Sealed this

Twenty-first Day of July 1981

GERALD J. MOSSINGHOFF

*Commissioner of Patents and Trademarks*